UNITED STATES PATENT OFFICE.

JOHN F. H. EASON, OF TYLER, TEXAS, ASSIGNOR OF ONE-FIFTH TO GEORGE L. TINKLE, ONE-SIXTH TO HERBERT C. PITTMAN, ONE-SIXTH TO JESSE E. McKEE, AND ONE-TWELFTH TO GRANVILLE M. GANN, ALL OF TYLER, TEXAS.

COMPOSITION OF MATTER FOR USE IN KILLING TREES AND OTHER VEGETABLE GROWTHS.

1,172,685.     Specification of Letters Patent.     Patented Feb. 22, 1916.

No Drawing.     Application filed March 4, 1915. Serial No. 12,125.

*To all whom it may concern:*

Be it known that I, JOHN F. H. EASON, a citizen of the United States, residing at Tyler, in the county of Smith and State of Texas, have invented a new and useful Composition of Matter for Use in Killing Trees and other Vegetable Growths, of which the following is a specification.

My composition consists of the following ingredients combined in the proportions stated, to wit,—arsenic 1 lb., sal soda 1¼ lbs., carbolic acid 4 oz., creosote 4 oz.

The composition is made by placing the arsenic in one gallon of pure water and then boiling the same until the arsenic thoroughly dissolves. The solution is then allowed to cool slightly, after which the sal soda is added. The carbolic acid is then added and the composition thoroughly mixed, after which the creosote is added and the composition is stirred until a thorough mixture is insured. The composition is then allowed to cool, after which it is ready for use.

When it is desired to kill a tree of ten inches or less in diameter, an incision is made in opposite portion of the tree, the incision being so shaped as to hold the liquid. One tablespoonful of liquid is placed in each incision and it will be found that the killing of the tree will be insured. Should the tree be more than ten inches in diameter three or four hacks or incisions are made in the tree, and each is provided with a tablespoonful of the composition.

It is well known of course that each one of the ingredients used in the present composition is effective to destroy vegetable life. It has been found in practice, however that any one of the ingredients, if used by itself, will not be sufficiently absorbed by a tree to effect the killing thereof. The creosote is used as a medium for carrying the poisonous ingredients into the vital part of the tree, creosote having the quality of quickly penetrating woody growths so that the tree to which the composition is applied will be quickly killed.

Grass can be destroyed by spraying the liquid thereover.

I claim:—

The herein described composition of matter for killing trees and the like, consisting approximately of pure water, 1 gallon, arsenic, 1 lb., sal soda, 1¼ lbs., carbolic acid, 4 ounces, and creosote, 4 ounces.

In testimony that I claim the foregoing as my own, I have hereto affixed my signature in the presence of two witnesses.

JOHN F. H. EASON.

Witnesses:
B. WHEELER,
M. B. YARBROUGH.